(12) United States Patent
Pillai et al.

(10) Patent No.: US 9,916,508 B2
(45) Date of Patent: Mar. 13, 2018

(54) DETECTING ROADWAY OBJECTS IN REAL-TIME IMAGES

(71) Applicant: TOYOTA JIDOSHA KABUSHIKI KAISHA, Toyota-shi, Aichi-ken (JP)

(72) Inventors: Preeti Jayagopi Pillai, Santa Clara, CA (US); Veeraganesh Yalla, Sunnyvale, CA (US); Kentaro Oguchi, Menlo Park, CA (US); Hirokazu Nomoto, Aichi-ken (JP)

( * ) Notice: Subject to any disclaimer, the term of this patent is extended or adjusted under 35 U.S.C. 154(b) by 126 days.

(21) Appl. No.: 14/645,936

(22) Filed: Mar. 12, 2015

(65) Prior Publication Data

US 2016/0267331 A1    Sep. 15, 2016

(51) Int. Cl.
G06K 9/00    (2006.01)
G06K 9/46    (2006.01)
(Continued)

(52) U.S. Cl.
CPC ......... G06K 9/00791 (2013.01); G01C 21/26 (2013.01); G06K 9/00805 (2013.01);
(Continued)

(58) Field of Classification Search
CPC ........... G06K 9/00805; G06K 9/00791; G06K 9/3241; G06K 2209/23; G06K 9/4609;
(Continued)

(56) References Cited

U.S. PATENT DOCUMENTS 5,434,927 A    7/1995    Brady et al.
7,167,787 B2   1/2007    Bastian et al.
(Continued)

FOREIGN PATENT DOCUMENTS

JP    2013211005 A    10/2013
WO    2014096240 A1    6/2014

OTHER PUBLICATIONS

Ess et al., Segmentation-Based Urban Traffic Scene Understanding, British Machine Vision Conference (BMVC '09), 2009, 11 pgs.
(Continued)

*Primary Examiner* — Kenny Cese
(74) *Attorney, Agent, or Firm* — Burbage Law, P.C.; Elizabeth Ruzich; Jon-Michael Burbage

(57) ABSTRACT

The disclosure includes a method that receives a real-time image of a road from a camera sensor communicatively coupled to an onboard computer of a vehicle. The method includes dividing the real-time image into superpixels. The method includes merging the superpixels to form superpixel regions. The method includes generating prior maps from a dataset of road scene images. The method includes drawing a set of bounding boxes where each bounding box surrounds one of the superpixel regions. The method includes comparing the bounding boxes in the set of bounding boxes to a road prior map to identify a road region in the real-time image. The method includes pruning bounding boxes from the set of bounding boxes to reduce the set to remaining bounding boxes. The method may include using a categorization module that identifies the presence of a road scene object in the remaining bounding boxes.

18 Claims, 15 Drawing Sheets

(51) Int. Cl.
*G06T 15/06* (2011.01)
*G01C 21/26* (2006.01)
*G08G 1/16* (2006.01)
*G06F 17/30* (2006.01)

(52) U.S. Cl.
CPC ............ *G06K 9/4642* (2013.01); *G06T 15/06* (2013.01); *B60T 2201/08* (2013.01); *G06F 17/30321* (2013.01); *G06K 9/00624* (2013.01); *G06K 9/00798* (2013.01); *G06K 2209/23* (2013.01); *G06T 2200/04* (2013.01); *G06T 2207/30252* (2013.01); *G06T 2207/30256* (2013.01); *G06T 2207/30261* (2013.01); *G06T 2210/12* (2013.01); *G06T 2210/61* (2013.01); *G08G 1/166* (2013.01)

(58) Field of Classification Search
CPC ............ G06K 9/00624; G06K 9/4652; G06K 9/4642; G06K 9/00798; G06T 15/06; G06T 2200/04; G06T 2210/12; G06T 2210/61; G06T 2207/30256; G06T 2207/30261; G06T 2207/30252; G01C 21/26; G08G 1/166
See application file for complete search history.

(56) References Cited

U.S. PATENT DOCUMENTS

| | | |
|---|---|---|
| 8,254,670 B2 | 8/2012 | Prokhorov |
| 8,447,139 B2 | 5/2013 | Guan et al. |
| 8,452,078 B2 | 5/2013 | Prokhorov |
| 8,520,899 B2 | 8/2013 | Brown et al. |
| 8,665,079 B2 | 3/2014 | Pawlicki et al. |
| 8,929,604 B2 | 1/2015 | Platonov et al. |
| 2007/0127779 A1* | 6/2007 | Miyahara ............... G01C 3/08 382/106 |
| 2007/0255480 A1* | 11/2007 | Southall ................. B60T 7/22 701/96 |
| 2010/0104199 A1* | 4/2010 | Zhang ................ G06K 9/00798 382/199 |
| 2012/0162415 A1* | 6/2012 | Wu ........................ H04N 7/18 348/142 |
| 2012/0242799 A1* | 9/2012 | Saito ..................... G01S 7/4802 348/46 |
| 2012/0328184 A1* | 12/2012 | Tang ..................... G06K 9/627 382/159 |
| 2013/0322692 A1* | 12/2013 | Guan ................ G06K 9/00791 382/103 |
| 2014/0180497 A1* | 6/2014 | Kojima .............. G06K 9/00798 701/1 |
| 2015/0030255 A1* | 1/2015 | Wu .................... G06K 9/00664 382/224 |
| 2015/0222859 A1* | 8/2015 | Schweid ............ G06K 9/00624 348/148 |

OTHER PUBLICATIONS

Yao et al., Describing the Scene as a Whole: Joint Object Detection, Scene Classification and Semantic Segmentation, CVPR 2012, 8 pgs.

* cited by examiner

300

305

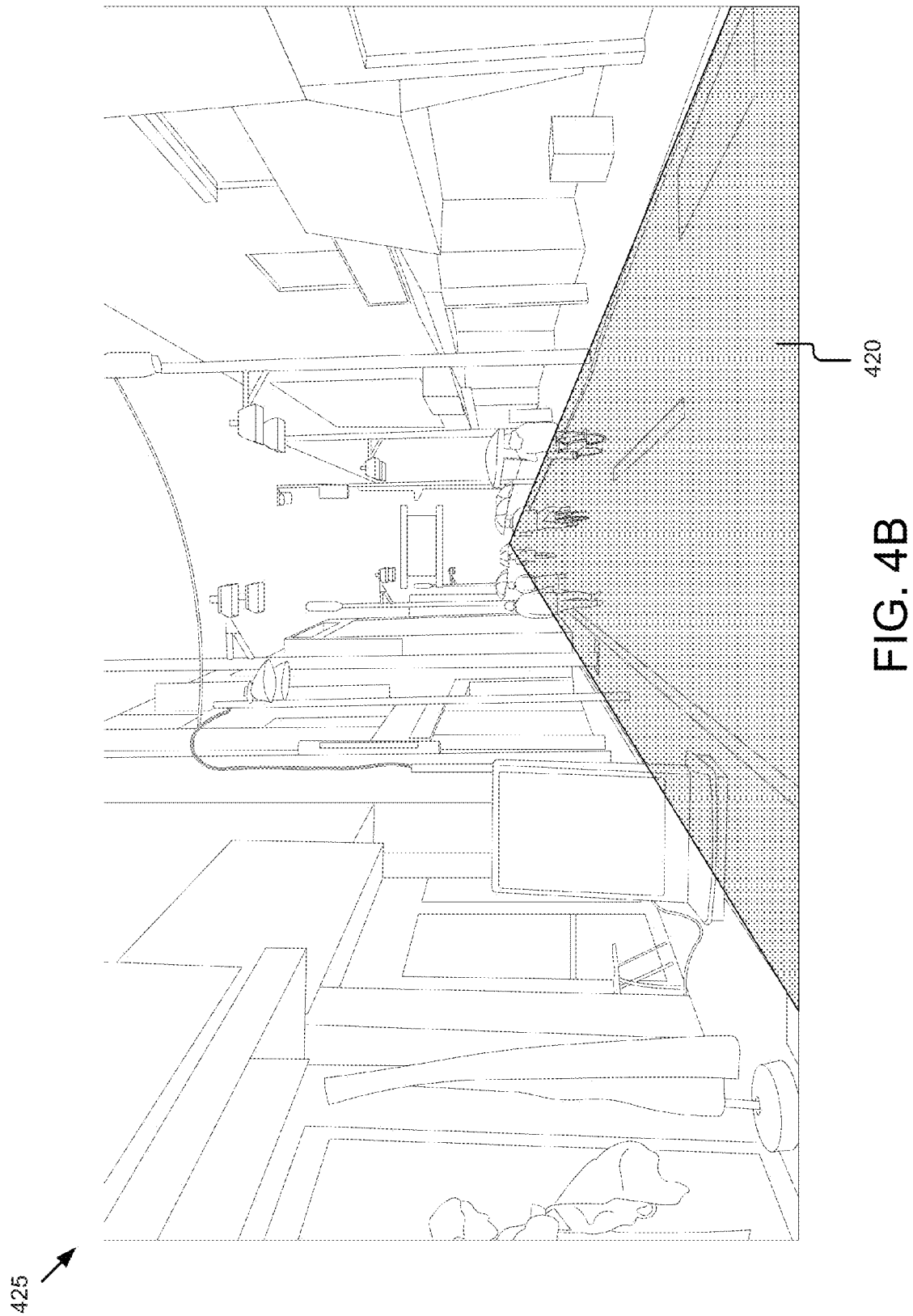

ns that are
currently available may perform object detection; however,
these object detection systems require high-end vision based
systems that use computationally expensive algorithms. For
example, the object detection systems use three-dimensional
images that have large file sizes, may only be used in places
where geo-reference information is available, and perform
feature extraction on the entire three-dimensional images.
As a result, the object detection systems are not commercially feasible for operation in a vehicle.

DETECTING ROADWAY OBJECTS IN REAL-TIME IMAGES

BACKGROUND

The specification relates to detecting roadway objects in real-time images.

Some drivers would like to take journeys that are easy and devoid of stress-inducing situations. For example, drivers would like to be able to avoid roads that have construction zones, a high volume of pedestrians, sudden vehicle traffic, or road-side barriers. Object detection systems that are currently available may perform object detection; however, these object detection systems require high-end vision based systems that use computationally expensive algorithms. For example, the object detection systems use three-dimensional images that have large file sizes, may only be used in places where geo-reference information is available, and perform feature extraction on the entire three-dimensional images. As a result, the object detection systems are not commercially feasible for operation in a vehicle.

SUMMARY

According to one innovative aspect of the subject matter described in this disclosure, a method includes determining, using a camera sensor communicatively coupled to an onboard computer of a vehicle, a real-time image of a road. The method includes dividing the real-time image into superpixels. The method includes merging the superpixels to form superpixel regions based on similarity of the superpixels. The method includes generating prior maps from a dataset of road scene images, the prior maps including a road prior map. The method includes drawing a set of bounding boxes where each bounding box surrounds one of the superpixel regions. The method includes comparing bounding boxes in the set of bounding boxes to the road prior map to identify a road region in the real-time image. The method includes pruning bounding boxes from the set of bounding boxes that are outside the road region to reduce the set to remaining bounding boxes. The method includes performing feature extraction and categorization to identify objects within the set of remaining bounding boxes.

These and other implementations may each optionally include one or more of the following operations and features. For instance, the operations further include: providing route guidance based on the identified objects; determining a box area relative to an image resolution of the real-time image for each of the bounding boxes in the set of bounding boxes and pruning bounding boxes from the set of bounding boxes with box areas that fall below a threshold value to reduce the set to the remaining bounding boxes; determining a bounding box aspect ratio and a location of each bounding box based on proximity to the road region, comparing the bounding box aspect ratio to a list of approved bounding box aspect ratios for the location based on the prior maps, and pruning bounding boxes from the set of bounding boxes where the bounding box aspect ratio fails to match one of the approved bounding box aspect ratios in the list of approved bounding box aspect ratios for the location to reduce the set to the remaining bounding boxes; determining a bounding box aspect ratio and a location of each bounding box in the real-time image based on proximity to the road region, wherein performing feature extraction and categorization comprises applying a type of categorization model to each of the remaining bounding boxes based on the bounding box aspect ratio and the location of each bounding box in the real-time image, identifying a presence or an absence of an object within each of the bounding boxes in the set of remaining bounding boxes, and determining a type of object based on the feature extraction and categorization; determining coordinates and a centroid value for each of the bounding boxes in the set of bounding boxes, comparing the superpixel regions to the road prior map to identify a horizon line and an approximate vanishing point in the real-time image, and pruning bounding boxes from the set of bounding boxes with a centroid value located above the horizon line; where merging the superpixels to form superpixel regions based on similarity of the superpixels uses a graph-based agglomerative technique; where the superpixel regions include structures and objects; and where the prior maps include locations for objects and structures where the objects and structures include one or more of a vehicle, a construction cone, a pedestrian, a bicycle, a sky, a motorcycle, foliage, a tree, an electrical pole, a streetlight, a road, and a road sign.

For instance, the features include: where merging the superpixels to form superpixel regions based on similarity of the superpixels includes determining texture and similarity of colors of the superpixels; where a type of categorization model includes one or more of a vehicle categorization model, a pedestrian categorization model, a pole categorization model, a bicycle categorization model, a motorcycle categorization model, a stationary bicycle and motorcycle categorization model, and a construction cone categorization model; and preprocessing the real-time image to remove noise and downsample.

In general, another innovative aspect of the subject matter described in this disclosure may be embodied in methods that include receiving a real-time image of a road from a camera sensor communicatively coupled to an onboard computer of a vehicle, dividing the real-time image into superpixels, merging the superpixels to form superpixel regions based on similarity of the superpixels, generating prior maps from a dataset of road scene images, the prior maps including a road prior map, drawing a set of bounding boxes where each bounding box surrounds a superpixel region, comparing the bounding boxes in the set of bounding boxes to the road prior map to identify a road region in the real-time image, determining a bounding box aspect ratio and a location of each bounding box in the real-time image based on proximity to the road region, comparing the bounding box aspect ratio to a list of approved bounding box aspect ratios for the location based on the prior maps, pruning bounding boxes from the set of bounding boxes: where the bounding box aspect ratio fails to match one of the approved bounding box aspect ratios in the list of approved bounding box aspect ratios for the location outside the road region to reduce the set to remaining bounding boxes, or the bounding boxes are outside the road region, performing feature extraction and categorization to identify objects within the remaining bounding boxes by assigning a type of categorization to each of the remaining bounding boxes based on the bounding box aspect ratio and the location of each bounding box in the real-time image, identifying a presence or an absence of an object within each of the remaining bounding boxes, and determining a type of object based on the feature extraction and categorization.

The disclosure is particularly advantageous in a number of respects. For example, the method minimizes the processing time by selectively identifying particular regions in a real-time image for object classification. The method is a low-cost vision solution that relies on a two-dimensional vision system instead of a more expensive three-dimensional vision sensor. The method is applicable in any given place where geo-reference may not be available. The method provides a lightweight object categorization approach because a subset of the real-time image is analyzed instead of the entire real-time image.

BRIEF DESCRIPTION OF THE DRAWINGS

The disclosure is illustrated by way of example, and not by way of limitation in the figures of the accompanying drawings in which like reference numerals are used to refer to similar elements.

FIG. 4B is a graphic representation of an example road with a determined road region.

DETAILED DESCRIPTION

Figure 1:
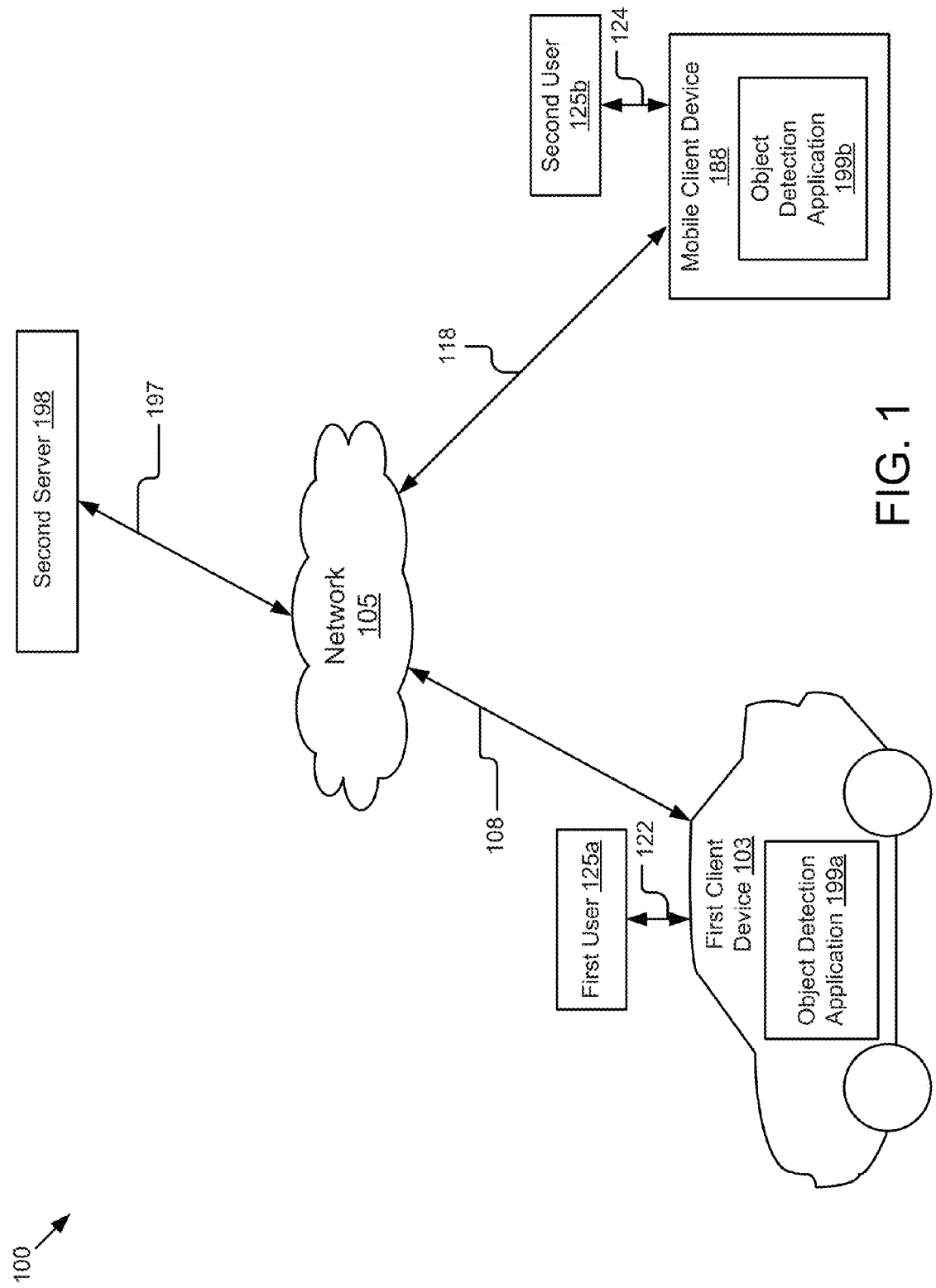
FIG. 1 is a block diagram illustrating an example system for detecting roadway objects in real-time images.

The object detection system described herein may include a computing device. For example, the object detection system may include a personal computer, laptop, tablet computer, server or any processor-based computing device including server software. The object detection system may include a memory and a processor device. The processor device may be programmed to perform one or more steps of a method 500 described below with reference to FIGS. 5A and 5B. One or more example implementations of the object detection system will be described below.

The object detection system may receive a real-time image of a road from a camera sensor communicatively coupled to an onboard computer of a vehicle. For example, the real-time image may include a road with traffic from other cars, pedestrians, and people on bicycles. The object detection system may divide the real-time image into superpixels. For example, the object detection system may over-segment the real-time image of the road using an iterative clustering technique to uniformly divide the real-time image into a grid-like region of superpixels. The object detection system may merge the superpixels to form superpixel regions based on similarity of the superpixels. For example, the object detection system may merge neighboring superpixels together based on texture and color to create well-defined homogeneous regions in the real-time image. The superpixel regions may have grid boundaries that closely trail the edges of objects and structures in the image.

The object detection system may generate prior maps from a dataset of road scene images, the prior maps including a road prior map. The prior maps may include an overlay of different objects associated with a particular category. For example, one prior map may include different images of cars, another prior map may include different images of pedestrians, and another prior map may include different images of people on bicycles. The objects in the prior maps are located in the areas where the objects are most likely to be found. For example, the prior map of cars includes cars in the center of the prior map because cars are likely to be found in the middle of the road. Conversely, the prior map of pedestrians includes pedestrians off to the side because pedestrians are more likely to be found on sidewalks than the middle of the road.

The object detection system may draw a set of bounding boxes, where each bounding box surrounds one of the superpixel regions. The bounding boxes may surround items that the object detection system suspects are objects or structures.

The object detection system may compare the superpixel regions to the road prior map to identify a road region in the real-time image. The object detection system may prune bounding boxes that are outside the road region to reduce the set to remaining bounding boxes. For example, objects are less likely to be found at the top of the image than within the road region. The object detection system may identify bounding box aspect ratios based on locations within the real-time image and compare the bounding box aspect ratios to a list of approved bounding box aspect ratios for the locations based on the prior maps. For example, the bounding box aspect ratio of a streetlamp will not be found in the middle of the road.

The object detection system may perform feature extraction and categorization to detect objects within the set of remaining bounding boxes. The object detection system may assign a type of categorization model to a bounding box based on the bounding box aspect ratio for the box and the location of the bounding box. For example, the object detection system may assign a pedestrian categorization model to bounding boxes along the road region if the bounding boxes have an aspect ratio that is similar to the dimensions of a pedestrian.

The object detection system may use the detected objects to guide the user. For example, the object detection system may generate directions for the user to avoid areas with traffic congestion from cars, pedestrians, and people on bicycles. In another embodiment, the object detection system may use the detected objects to warn the user about dangerous situations, such as objects in the road.

System Overview

FIG. 1 illustrates a block diagram of one embodiment of an object detection system 100 for detecting roadway objects in real-time images. The object detection system 100 includes a first client device 103, a mobile client device 188, and a second server 198. The first client device 103 and the mobile client device 188 can be accessed by users 125a and 125b (also referred to herein individually and collectively as user 125), via signal lines 122 and 124, respectively. In the illustrated embodiment, these entities of the object detection system 100 may be communicatively coupled via a network 105. The object detection system 100 may include other servers or devices not shown in FIG. 1 including, for example, a traffic server for providing traffic data, a weather server for providing weather data, a power service server for providing power usage service (e.g., a billing service), and a map server for providing map data.

The first client device 103 and the mobile client device 188 in FIG. 1 can be used by way of example. While FIG. 1 illustrates two client devices 103 and 188, the disclosure applies to a system architecture having one or more client devices 103, 188. Furthermore, although FIG. 1 illustrates one network 105 coupled to the first client device 103, the mobile client device 188, and the second server 198, in practice one or more networks 105 can be connected to these entities. While FIG. 1 includes one second server 198, the object detection system 100 could include one or more second servers 198.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, WAP, e-mail, etc. In some implementations, the network 105 may include a GPS satellite for providing GPS navigation to the first client device 103 or the mobile client device 188. In some implementations, the network 105 may include a GPS satellite for providing GPS navigation to the first client device 103 or the mobile client device 188. The network 105 may be a mobile data network such as 3G, 4G, LTE, Voice-over-LTE ("VoLTE"), or any other mobile data network or combination of mobile data networks.

In some implementations, an object detection application 199a can be operable on the first client device 103. The first client device 103 can be a mobile client device with a battery system. For example, the first client device 103 can be one of a vehicle (e.g., an automobile, a bus), a bionic implant, or any other mobile system including non-transitory computer electronics and a battery system. In some implementations, the first client device 103 may include a computing device that includes a memory and a processor. In the illustrated embodiment, the first client device 103 is communicatively coupled to the network 105 via signal line 108.

In other implementations, an object detection application 199b can be operable on the mobile client device 188. The mobile client device 188 may be a portable computing device that includes a memory and a processor, for example, a laptop computer, a tablet computer, a mobile telephone, a personal digital assistant ("PDA"), a mobile e-mail device, a portable game player, a portable music player, or other portable electronic device capable of accessing the network 105. In some implementations, the object detection application 199b may act in part as a thin-client application that may be stored in part on the first client device 103 and in part on the mobile client device 188. For example, the object detection application 199a on the first client device 103 may receive a real-time image of a road and perform object detection. The object detection application 199b on the mobile client device 188 may receive the detected objects from the object detection application 199b and use the detected objects to guide the user by incorporating the detected objects into route guidance. In the illustrated embodiment, the mobile client device 188 is communicatively coupled to the network 105 via a signal line 118.

In some implementations, the first user 125a and the second user 125b can be the same user 125 interacting with both the first client device 103 and the mobile client device 188. For example, the user 125 can be a passenger or a driver sitting in the first client device 103 (e.g., a vehicle) and operating on the mobile client device 188 (e.g., a smartphone). In some other implementations, the first user 125a and the second user 125b may be different users 125 that interact with the first client device 103 and the mobile client device 188, respectively.

The object detection application 199 can be software for detecting objects in real-time images. In some implementations, the object detection application 199 can be implemented using hardware including a field-programmable gate array ("FPGA") or an application-specific integrated circuit ("ASIC"). In some other implementations, the object detection application 199 can be implemented using a combination of hardware and software. The object detection application 199 may be stored in a combination of the devices and servers, or in one of the devices or servers.

The second server 198 can be a hardware server that includes a processor, a memory, and network communication capabilities. In the illustrated embodiment, the second server 198 is coupled to the network 105 via a signal line 197. The second server 198 sends and receives data to and from other entities of the object detection system 100 via the network 105. For example, the second server 198 may receive a request for data from the object detection application 199. The second server 198 transmits the requested data to the object detection application over the network 105.

The second server 198 includes an application that uses the detected objects to help the user. The second server 198 may include a map application that uses the detected objects to determine directions for the user. For example, where the object detection application 199 determines that a user 125 is driving in a construction zone, the map application may determine an alternate route. In some implementations, the map application may receive detected objects from multiple cars and may update a map to warn other users about stressful situations. For example, the map application may determine that a user in a first vehicle is about to enter a construction zone based on detected objects received from a user in a second vehicle. The map application may generate an alternate route to prevent the user in the first vehicle from driving in the construction zone.

The second server 198 may include other applications for helping a user 125. For example, the second server 198 may include an application for warning the user 125 of obstacles in the road, provide traffic updates, etc. In some implementations, the second server 198 may include an application for providing cloud-based computing for the object detection application 199. The cloud-based computing may be helpful for providing users 125 with real-time updates about obstacles in the road. For example, the cloud-based computing application may receive a list of objects from an object detection application 199 in a known location and transmit the list of objects to another object detection application 199 for a first mobile device 103 that will be travelling to the same location in the future.

Example Automaticity Application

Figure 2:
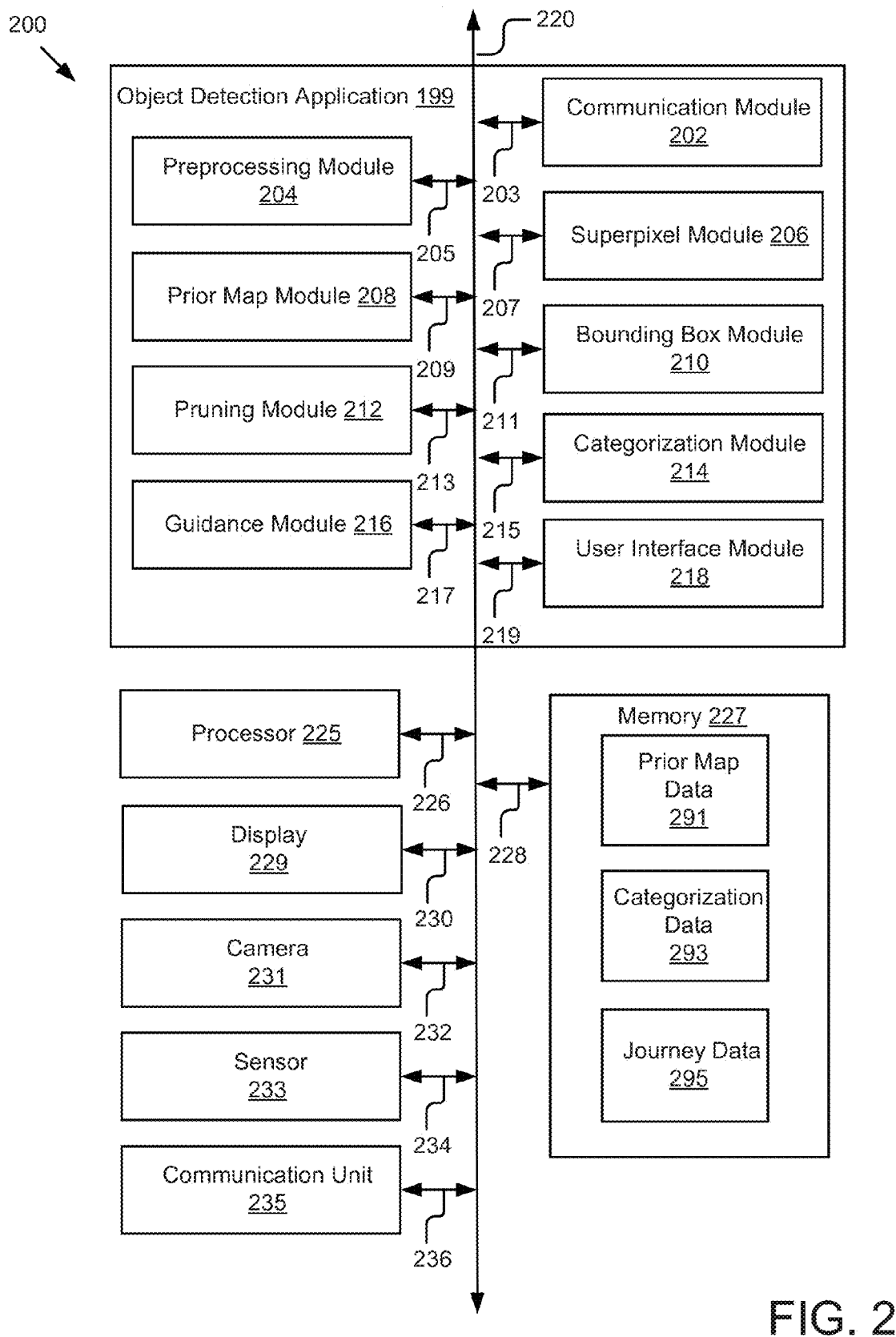
FIG. 2 is a block diagram illustrating an example object detection device.

FIG. 2 is a block diagram illustrating an example object detection device 200. The object detection device 200 can be, include, or be included in the first client device 103 or the mobile client device 188 of FIG. 1. FIG. 2 can include the object detection application 199, a processor 225, a memory 227, a display 229, a camera 231, a sensor 233, and a communication unit 235. The components of the object detection device 200 are communicatively coupled by a bus 220. In some implementations, the object detection device 200 may be an element of one or more of the first client device 103 and the mobile client device 188.

The processor 225 includes an arithmetic logic unit, a microprocessor, a general-purpose controller, or some other processor array to perform computations and provide electronic display signals to a display device. The processor 225 processes data signals and may include various computing architectures including a complex instruction set computer (CISC) architecture, a reduced instruction set computer (RISC) architecture, a graphic processor unit (GPU) architecture or an architecture implementing a combination of instruction sets. Although FIG. 2 includes a single processor 225, multiple processors 225 may be included. Other processors, operating systems, sensors, displays, and physical configurations may be possible. The processor 225 is coupled to the bus 220 for communication with the other components via signal line 226.

The memory 227 stores instructions or data that may be executed by the processor 225. The instructions or data may include code for performing the techniques described herein. The memory 227 may include a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 227 is coupled to the bus 220 for communication with the other components via signal line 228.

As illustrated in FIG. 2, the memory 227 stores one or more of prior map data 291, categorization data 293, and journey data 295.

The prior map data 291 includes road scene single image frames that were collected from an onboard front-facing vision sensor. The road scene single images include diverse types of roads, various dynamic objects, and traffic conditions ranging from free-flowing traffic to heavily congested traffic. The prior map data 291 also includes prior maps generated by the prior map module 208 and discussed in greater detail below. The prior maps may include locations for objects and structures and categorization of objects and structures including one or more of a vehicle, a construction cone, a pedestrian, a bicycle, a sky, a motorcycle, foliage, a tree, an electrical pole, a streetlight, a road, and a road sign. The prior maps may include object and structure data. For example, the prior maps may include locations within the prior map where objects and structures are expected to be located. The prior maps may also include a list of approved bounding box aspect ratios for each location in the prior map.

The categorization data 293 includes data for categorizing objects and structures. For example, the categorization data 293 includes object aspect ratios for different objects. For example, a streetlamp has an object aspect ratio with a height that is longer than a width and a vehicle aspect ratio has a width that is longer than a height. The categorization data 293 includes box area thresholds that are relative to an image resolution of a real-time image. The categorization data 293 includes categorization models that the object detection application 199 may apply to bounding boxes in the real-time images. The categorization models may include a vehicle categorization model, a pedestrian categorization model, a pole categorization model, a bicycle categorization model, a motorcycle categorization model, a stationary bicycle and motorcycle categorization model, and a construction cone categorization model. The categorization data 293 may also include a list of object labels for objects in the real-time images.

The journey data 295 includes information about the user's journey, such as start points, destinations, durations, routes associated with historical journeys, etc. For example, the journey data 295 could include a log of all locations visited by the first client device 103, all locations visited by the user 125 (e.g., locations associated with both the first client device 103 and the mobile client device 188), locations requested by the user 125, etc. The journey data 295 may include the real-time images captured by the camera 231.

The display 229 can include hardware for displaying graphical data from the object detection application 199. For example, the display 229 renders graphics for displaying a user interface that displays map data including detected objects to the user. The display 229 is coupled to the bus 220 via signal line 230.

The camera 231 can include a sensor for capturing two-dimensional real-time images of the road. The camera 231 may be positioned in the front part of the car. For example, the camera 231 may be positioned to record everything that the user can see. The real-time images may be associated with a timestamp. The camera 231 transmits the real-time images to the object detection application 199 or stores the real-time images as categorization data 293 in the memory 227. In some implementations where multiple cameras 231 are used, the cameras 231 may be positioned to maximize the views of the road. For example, the cameras 231 could be positioned on each side of a grill on the front of the vehicle. The camera(s) 231 are coupled to the bus 220 via signal line 232.

The camera 231 captures real-time images at a predefined capture rate. The predefined capture rate may be once every millisecond, once every 0.5 seconds, once a second, etc.

The sensor 233 can include a device that provides sensor data about a state of the vehicle. The sensor 233 may be communicatively coupled to an onboard computer of a vehicle. The sensor 233 may include an infrared detector, a motion detector, a thermostat, etc. For example, the first client device 103 may include sensors for measuring one or more of a current time, a location (e.g., a latitude, longitude, and altitude of a location), an acceleration of a vehicle, a velocity of a vehicle, a fuel tank level of a vehicle, a battery level of a vehicle, etc. Alternatively or additionally, the sensor 233 can include a component or module of another system or device (e.g., radio, infotainment system, thermostat) that reports a status of the vehicle or a particular device that is part of the vehicle to the object detection device 200. In some implementations, the sensor 233 includes hardware for performing location detection, for example, a global positioning system (GPS), location detection through triangulation via a wireless network, etc. The sensor 233 is coupled to the bus 220 via signal line 234.

The communication unit 235 can include hardware that transmits and receives data to and from at least one of the first client device 103 and the mobile client device 188, depending upon where the object detection application 199 is stored. The communication unit 235 is coupled to the bus 220 via signal line 236. In some implementations, the communication unit 235 includes a port for direct physical connection to the network 105 or to another communication channel. For example, the communication unit 235 includes a USB, SD, CAT-5, or similar port for wired communication with the first client device 103. In some implementations, the communication unit 235 includes a wireless transceiver for exchanging data with the first client device 103 or other communication channels using one or more wireless communication methods, including IEEE 802.11, IEEE 802.16, Bluetooth®, or another suitable wireless communication method.

In some implementations, the communication unit 235 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 235 includes a wired port and a wireless transceiver. The communication unit 235 also provides other conventional connections to the network 105 for distribution of files or median objects using standard network protocols including TCP/IP, HTTP, HTTPS, and SMTP, etc.

In some implementations, the object detection application 199 includes a communication module 202, a preprocessing module 204, a superpixel module 206, a prior map module 208, a bounding box module 210, a pruning module 212, a categorization module 214, a guidance module 216, and a user interface module 218.

The communication module 202 can include code and routines for handling communications between the object detection application 199 and other components of the object detection device 200. In some implementations, the communication module 202 can include a set of instructions executable by the processor 225 to provide the functionality described below for handling communications between the object detection application 199 and other components of the object detection device 200. In some implementations, the communication module 202 can be stored in the memory 227 of the object detection device 200 and can be accessible and executable by the processor 225.

The communication module 202 sends and receives data, via the communication unit 235, to and from one or more of the first client device 103, the mobile client device 188, and the second server 198 depending upon where the object detection application 199 may be stored. For example, the communication module 202 receives, via the communication unit 235, route guidance, such as map directions, from the second server 198. The communication module 202 sends the route guidance to the guidance module 216 for supplementing the map directions with object data. The communication module 202 is coupled to the bus 220 via signal line 203.

In some implementations, the communication module 202 receives data from components of the object detection application 199 and stores the data in the memory 227. For example, the communication module 202 receives real-time images from the camera 231 and stores it as categorization data 293 in the memory 227.

In some implementations, the communication module 202 may handle communications between components of the object detection application 199. For example, the communication module 202 receives prior map data 291 from the prior map module 208 and transmits the prior map data 291 to the pruning module 212.

The preprocessing module 204 can include code and routines for receiving a real-time image from the sensor 233 via the communication module 202 and preprocessing the real-time image. In some implementations, the preprocessing module 204 can include a set of instructions executable by the processor 225 to provide the functionality described below for receiving and preprocessing the real-time image. In some implementations, the preprocessing module 204 can be stored in the memory 227 of the object detection device 200 and can be accessible and executable by the processor 225. The preprocessing module 204 is coupled to the bus 220 via signal line 205.

The preprocessing module 204 receives two-dimensional images of a road from the camera 231. The road may include a paved road in a busy city, a gravel road in a small town, etc. In some implementations the preprocessing module 204 preprocesses the real-time image to remove noise in the real-time image. For example, the preprocessing module 204 filters noise from the image, for example, by performing linear filtering, median filtering, or adaptive filtering. The preprocessing module 204 may also downsample the real-time image by reducing the image resolution. Removing noise and downsampling the real-time image may prepare the real-time image for easier generation of superpixels. Other examples of preprocessing are possible.

The superpixel module 206 can include code and routines for dividing the real-time image into superpixels and merging the superpixels to form superpixel regions based on similarity of the superpixels. In some implementations, the superpixel module 206 can include a set of instructions executable by the processor 225 to provide the functionality described below for generating superpixels and superpixel regions. In some implementations, the superpixel module 206 can be stored in the memory 227 of the object detection device 200 and can be accessible and executable by the processor 225. The superpixel module 206 is coupled to the bus 220 via signal line 207.

The superpixel module 206 receives the real-time image from the communication module 202 or the memory 227. The real-time image may be received via the camera 231 or the real-time image may be a preprocessed real-time image generated by the preprocessing module 204.

The superpixel module 206 divides the real-time image into superpixels, for example, by clustering pixels iteratively using a graph-based agglomerative technique. The superpixel module 206 may divide the real-time image into a grid-like region of superpixels. The superpixel module 206 may use the underlying pixels that constitute the real-time image to determine how to cluster the pixels into the grid-like region of superpixels. The grid may include a predetermined number of superpixels. For example, the grid may include 250 superpixels, 500 superpixels, 1,000 superpixels, etc.

The superpixel module 206 may generate superpixel regions by merging the superpixels based on similarity of the superpixels. For example, the superpixel module 206 may merge the superpixels based on color and texture of the superpixels. The superpixel module 206 may use a graph-based agglomerative technique to create well-defined homogenous regions in the image. The superpixel module 206 may generate the superpixel regions as a second layer of the real-time image.

The superpixel regions may represent potential objects and structures in the real-time image. The superpixel region edges may include grid boundaries that closely trail the edges of the objects and structures in the real-time image. The objects may include vehicles, motorcycles, bicycles, construction cones, pedestrians, poles, streetlights, etc. The structures may include a road, sky, buildings, walls, fences, etc.

The prior map module 208 can include code and routines for generating prior maps for a dataset of road scene images. In some implementations, the prior map module 208 can include a set of instructions executable by the processor 225 to provide the functionality described below for generating prior maps. In some implementations, the prior map module 208 can be stored in the memory 227 of the object detection device 200 and can be accessible and executable by the processor 225. The prior map module 208 is coupled to the bus 220 via signal line 209.

The prior map module 208 receives a dataset of road scene images. The road scene images may be collected from an onboard front-facing vision sensor. In some implementations, the camera 231 may be the onboard front-facing vision sensor. In some implementations, the onboard front-facing vision sensor may be associated with a different vehicle. The road scene images may be collected from different kinds of roads (e.g., paved, dirt, gravel, etc.), different kinds of dynamic objects (e.g., vehicles, people on bicycles, people on skateboards, people on scooters, etc.), and traffic conditions varying from free-flowing to heavily congested scenes.

The prior map module 208 may generate prior maps of objects and scene regions to determine a most likely location of objects and structures in the prior maps. The prior map module 208 may generate the prior maps by generating an overlay of road scene images that include the object or structure. In some implementations, the prior maps may include one or more of a vehicle, a construction cone, a pedestrian, a bicycle, a sky, a motorcycle, foliage, an electrical pole, a streetlight, a road, and a road sign. FIGS. 3A-3K are graphic representations of example prior maps of objects and structures. In the following illustrations, a level of shading is proportional to a likelihood that the object or structure may be found in a particular location.

Figure 3A:
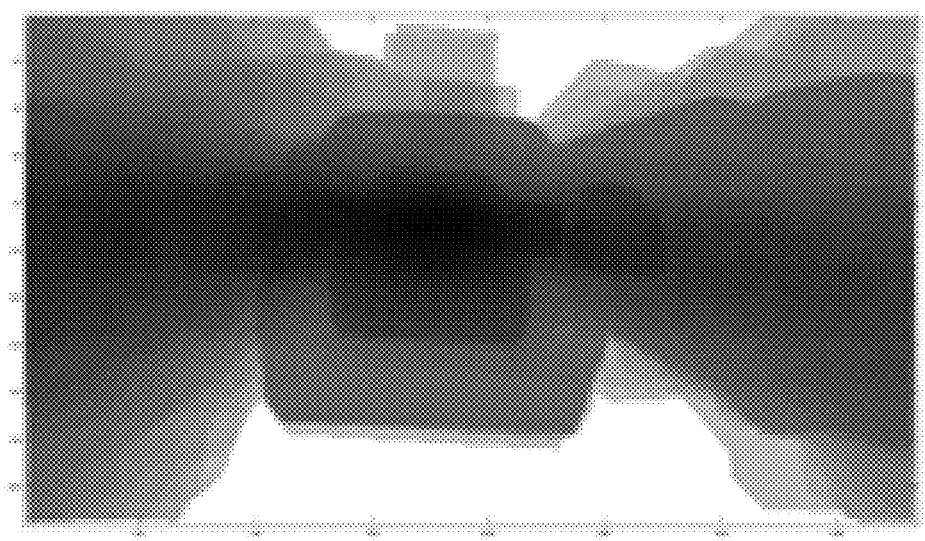
FIG. 3A is a graphic representation of an example prior map of vehicles.

FIG. 3A is a graphic representation 300 of an example prior map of vehicles. In this example, vehicles are most likely located in the center of a lane or in adjacent lanes of a road region. This corresponds to locations where vehicles would be expected, namely, in front of a vehicle or to the side of the vehicle if the vehicle is driving on a multi-lane highway.

Figure 3B:
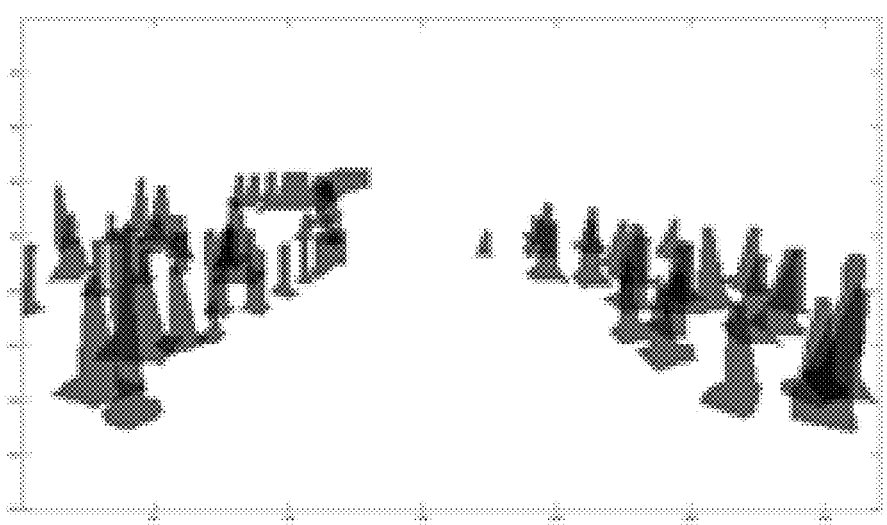
FIG. 3B is a graphic representation of an example prior map of construction cones.

FIG. 3B is a graphic representation 305 of an example prior map of construction cones. In this example, the construction cones are most likely located to the side of a road. This corresponds to locations where construction cones would be expected, namely, to the side of the road in areas where construction is occurring.

Figure 3C:
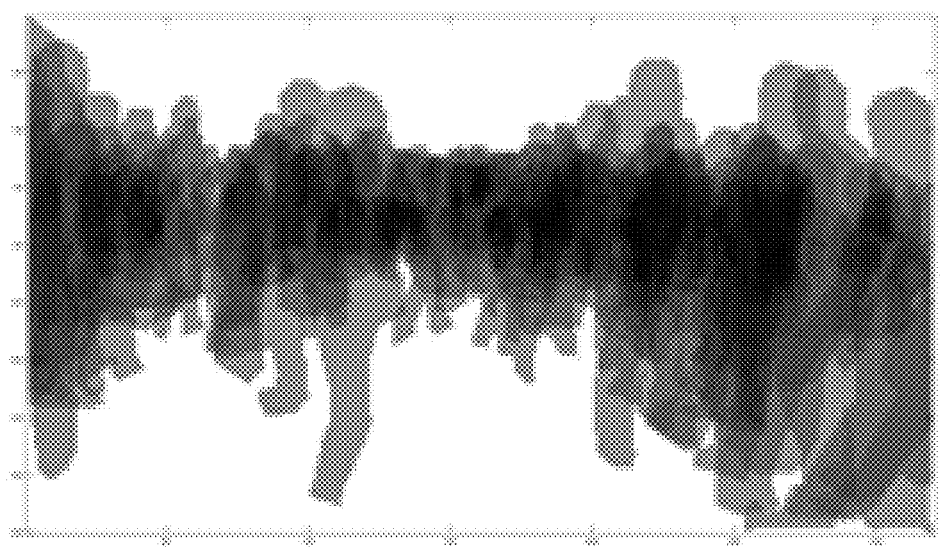
FIG. 3C is a graphic representation of an example prior map of pedestrians.

FIG. 3C is a graphic representation 310 of an example prior map of pedestrians. In this example, the pedestrians may be located anywhere along a road, including in the center of the road while crossing the street.

Figure 3D:
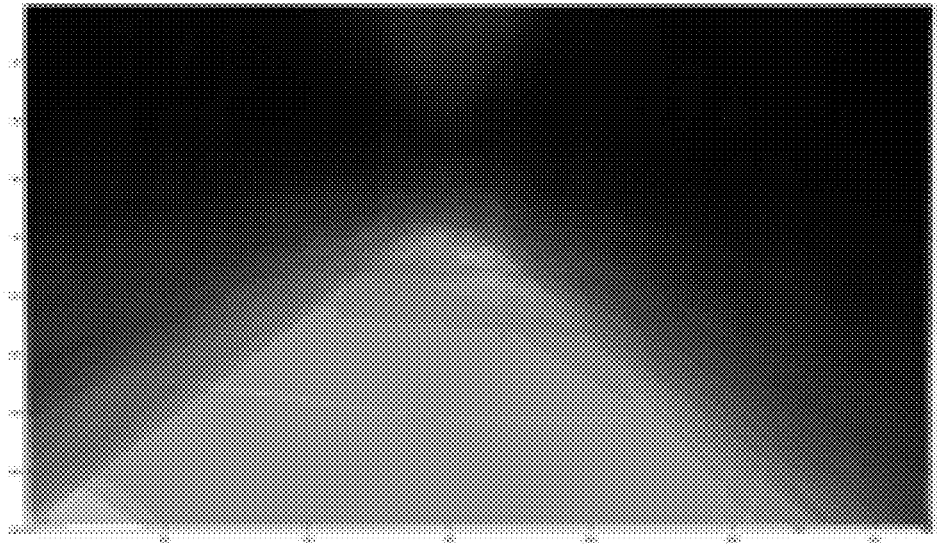
FIG. 3D is a graphic representation of an example prior map of a structure.

FIG. 3D is a graphic representation 315 of an example prior map of a structure. A structure includes, for example, buildings. In this example, the buildings are most likely to be located on the sides of a road because structures are stationary and a vehicle would not drive through the structures.

Figure 3E:
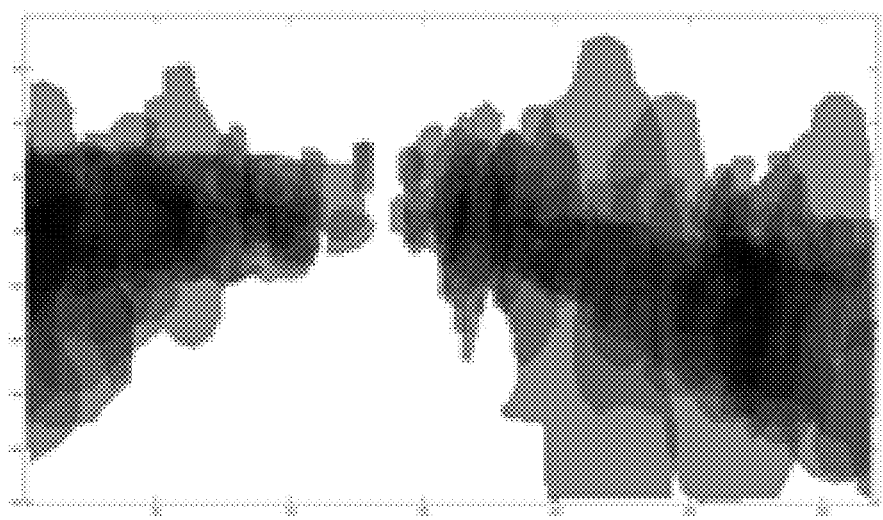
FIG. 3E is a graphic representation of an example prior map of bicycles.

FIG. 3E is a graphic representation 320 of an example prior map of bicycles. The bicycles occupy the lower half of the road scene image. In this example, the bicycles are most likely to be located on the sides of a road that are adjacent to a vehicle, but they may also be located in front of the vehicle. This corresponds to locations where bicycles would be expected, namely, on the side of the road when the vehicle is driving down a road and in front of the vehicle if the vehicle is stopped and the bicycle is crossing in front of the vehicle.

Figure 3F:
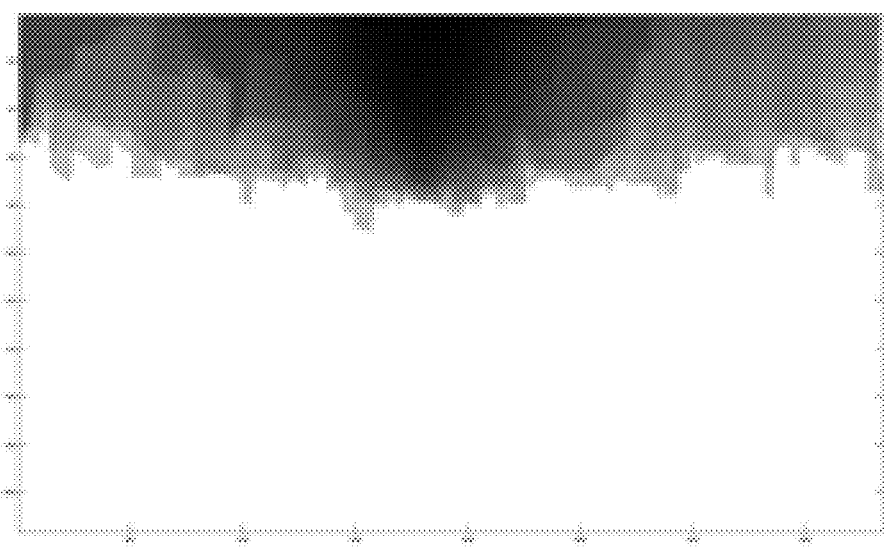
FIG. 3F is a graphic representation of an example prior map of skies.

FIG. 3F is a graphic representation 325 of an example prior map of skies. In this example, the sky is most likely to be located above a vehicle.

Figure 3G:
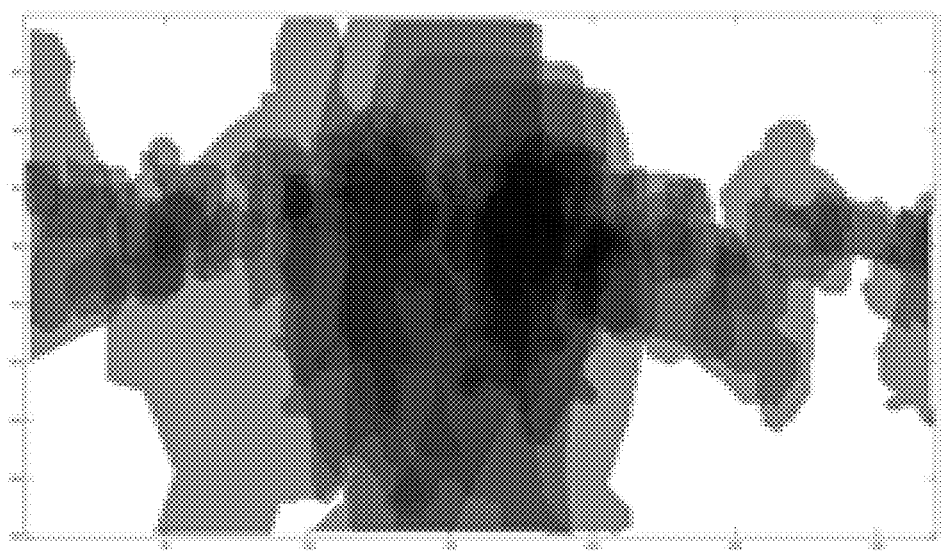
FIG. 3G is a graphic representation of an example prior map of motorcycles.

FIG. 3G is a graphic representation 330 of an example prior map of motorcycles. The motorcycles occupy the lower half of the road scene image. In this example, the motorcycles are most likely to be located in the center of a lane or in adjacent lanes of a road region. This corresponds to locations where motorcycles would be expected, namely, in front of the vehicle on a highway and on the sides of the vehicle in other lanes of a multi-lane highway.

Figure 3H:
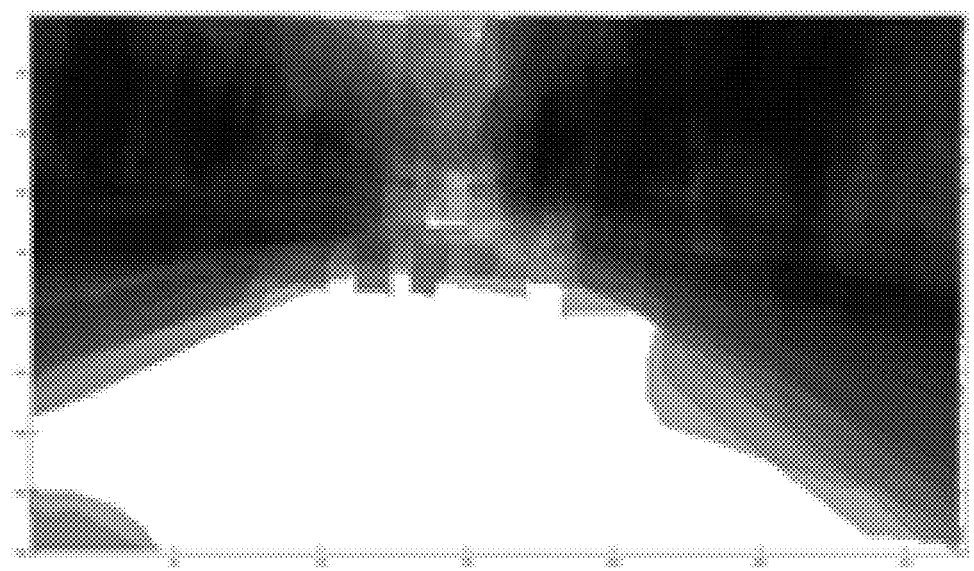
FIG. 3H is a graphic representation of an example prior map of foliage and trees.

FIG. 3H is a graphic representation 335 of an example prior map of foliage and trees. In this example, the foliage and trees are most likely to be located on the sides of a vehicle with some likelihood of the foliage and trees being in front of the vehicle.

Figure 3I:
FIG. 3I is a graphic representation of an example prior map of electric poles and streetlights.
Figure 3I:
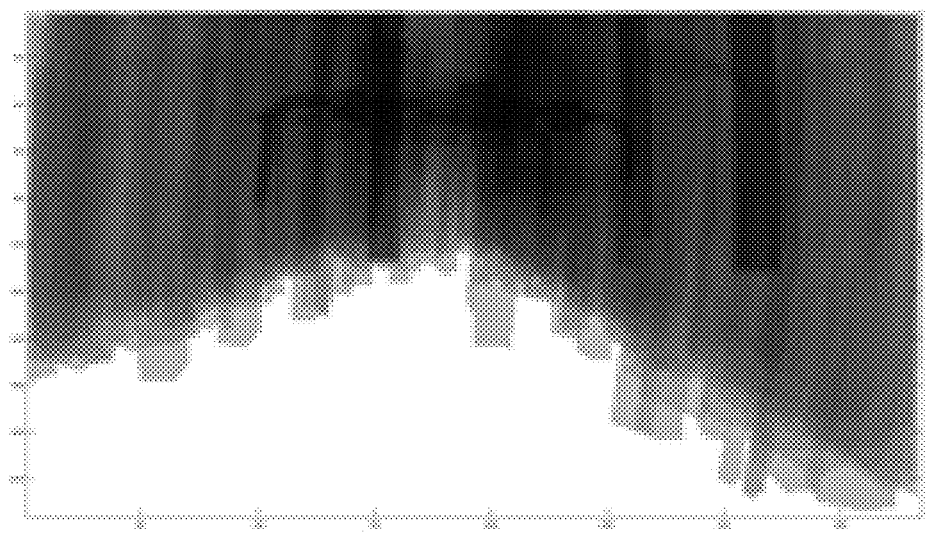

FIG. 3I is a graphic representation 340 of an example prior map of electric poles and streetlights. The electric poles and streetlights are long vertical structures that mostly occupy the sides of the road. Although some of the poles and streetlights appear to be in front of the vehicle, they are most likely along the sides of a road, but appear to be in front of the vehicle because of an optical illusion resulting from a vanishing point of a road.

Figure 3J:
FIG. 3J is a graphic representation of an example prior map of roads.
Figure 3J:
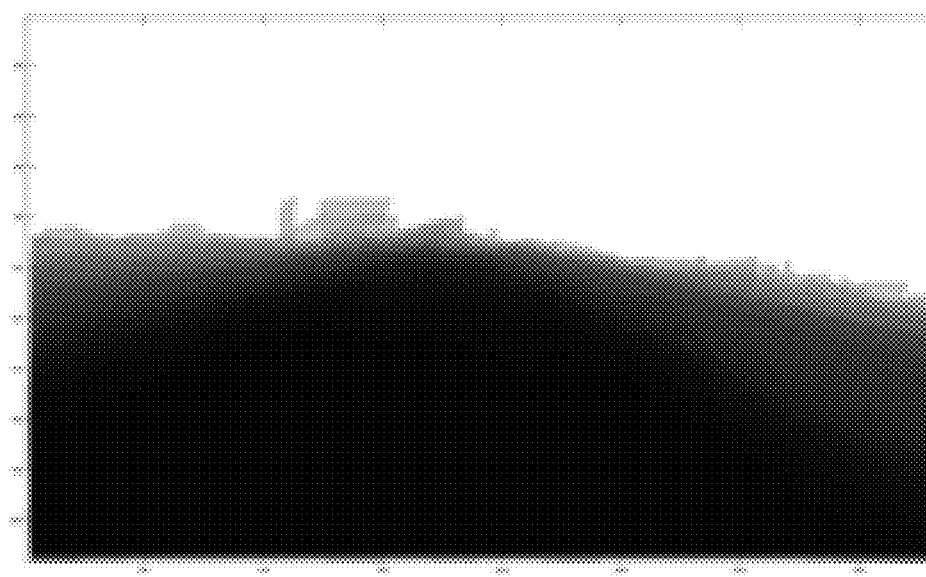

FIG. 3J is a graphic representation 345 of an example prior map of roads. In this example, the road is most likely to be in front of a vehicle. The road also includes some shapes along the road that are likely a result of building being located along the edge of the road.

Figure 3K:
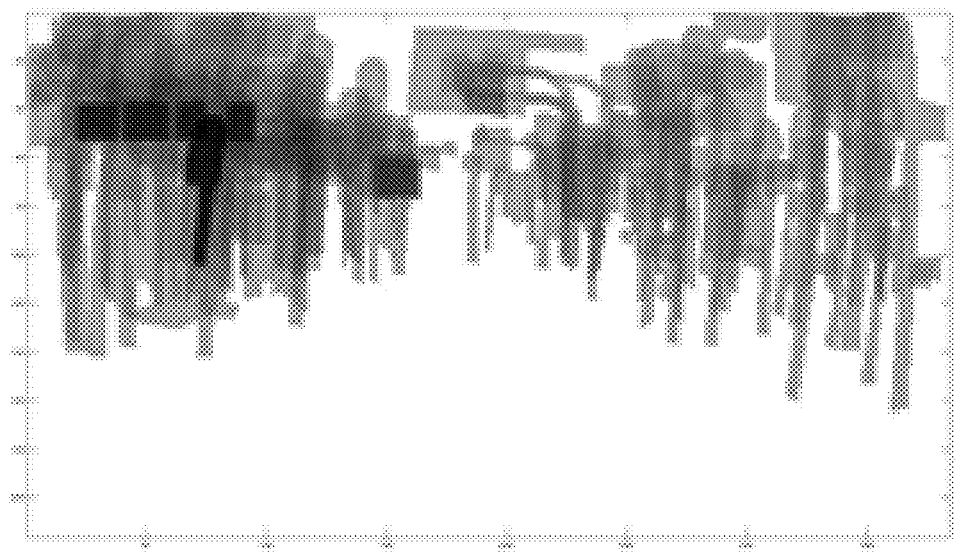
FIG. 3K is a graphic representation of an example prior map of road signs.

FIG. 3K is a graphic representation 350 of an example prior map of road signs. In this example, the road signs are likely to be on the sides of a vehicle or above the vehicle. The road signs that are above the vehicle are likely overpass signs on a highway.

The bounding box module 210 can include code and routines for drawing bounding boxes around each of the superpixel regions. In some implementations, the bounding box module 210 can include a set of instructions executable by the processor 225 to provide the functionality described below for drawing bounding boxes around each of the superpixel regions. In some implementations, the bounding box module 210 can be stored in the memory 227 of the object detection device 200 and can be accessible and executable by the processor 225. The bounding box module 210 is coupled to the bus 220 via signal line 211.

The bounding box module 210 may draw a set of bounding boxes where each bounding box surrounds a superpixel region. The bounding boxes are indicative of regions in the real-time image that might contain an object of interest. In some implementations, the bounding box module 210 generates an initial candidate list of bounding boxes that may contain an object or a structure. For each of the bounding boxes in the initial candidate list, the bounding box module 210 determines coordinates of the bounding box, a centroid value for the bounding box, and a probability label that describes a potential type of object or structure associated with the bounding box. The bounding box module 210 stores the initial candidate list as categorization data 293.

Figure 4A:
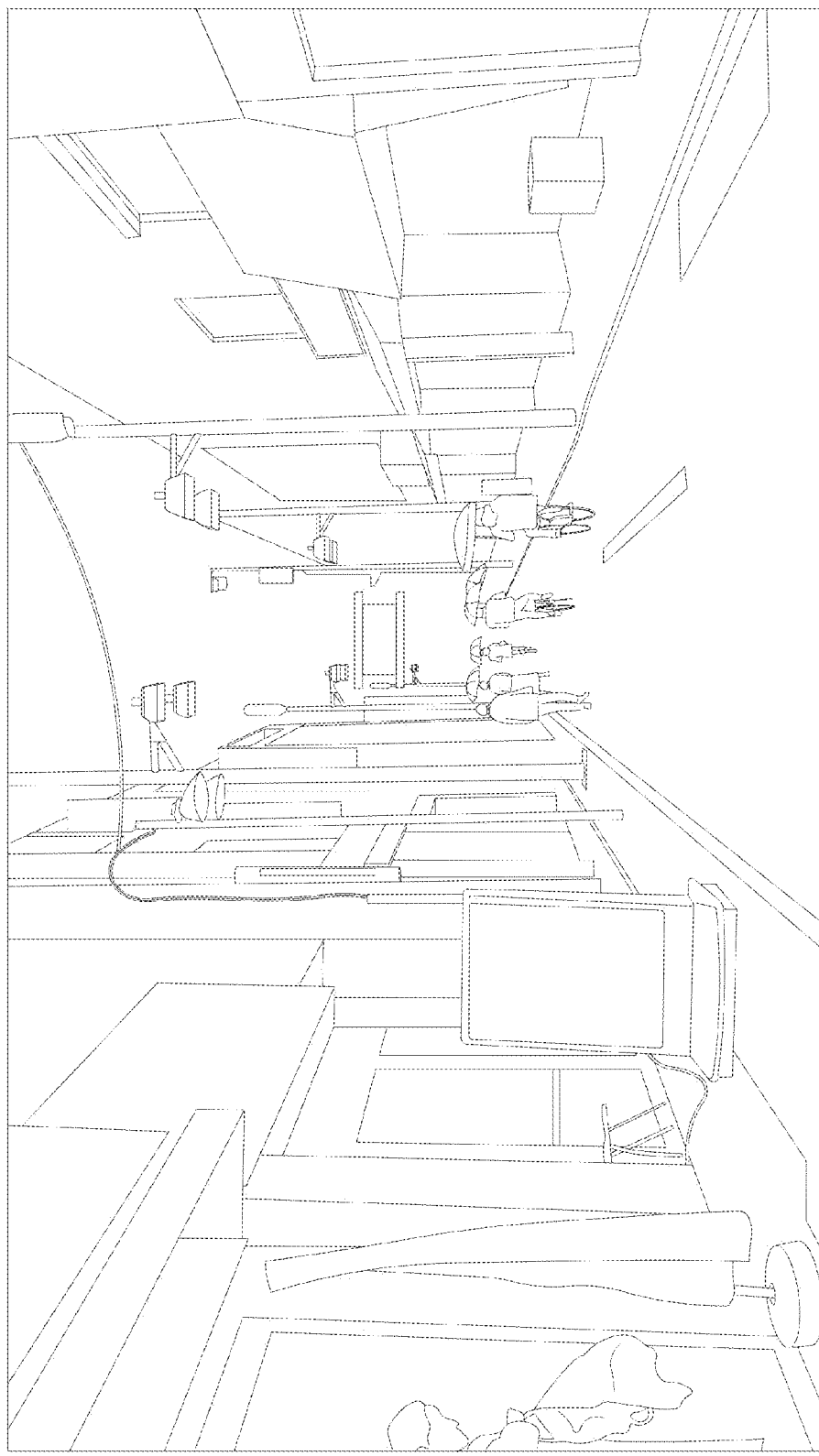
FIG. 4A is a graphic representation of an example real-time image of a road.

Turning to FIG. 4A, a graphic representation 400 of an example real-time image of a road is illustrated. In this example, the real-time image is a road in a busy city with pedestrians, bicycles, streetlamps, and structures. FIG. 4B is a graphic representation 425 of an example road with a determined road region 420.

Figure 4C:
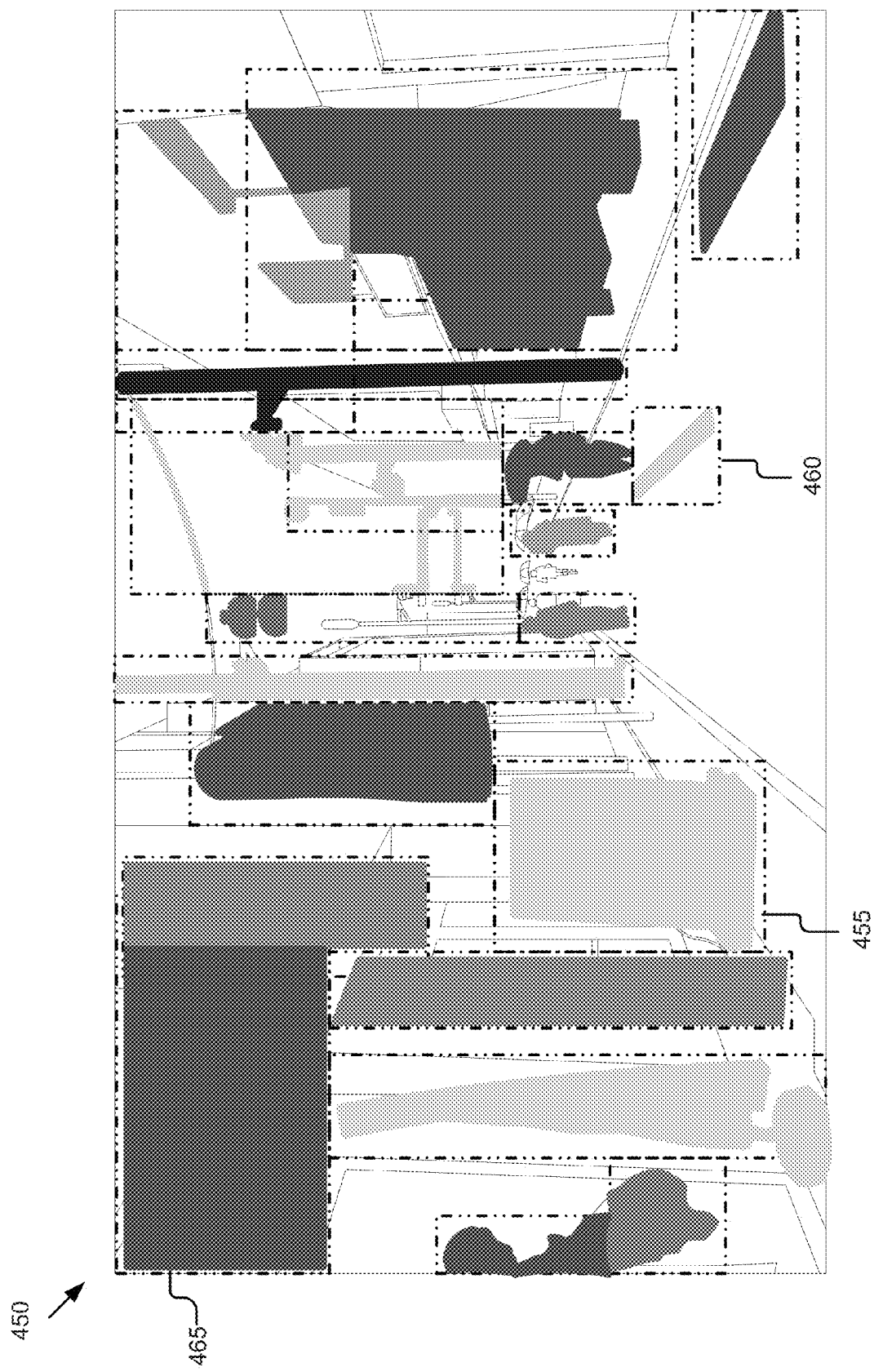
FIG. 4C is a graphic representation of the example real-time image of the road with graph agglomerated superpixel regions.

FIG. 4C is a graphic representation 450 of the example real-time image of the road with graph agglomerated superpixel regions. The superpixel regions are generated from pixels that have similar colors and textures. The width and height of the bounding boxes encapsulating the superpixel regions are constrained by the respective superpixel region's area. For example, bounding box 465 encloses a superpixel region formed from the shop structure having similar color and texture properties. Bounding box 455 encloses a super pixel region corresponding to a store sign with a similar background color. Bounding box 460 encloses a superpixel region corresponding to a road divider.

Figure 4D:
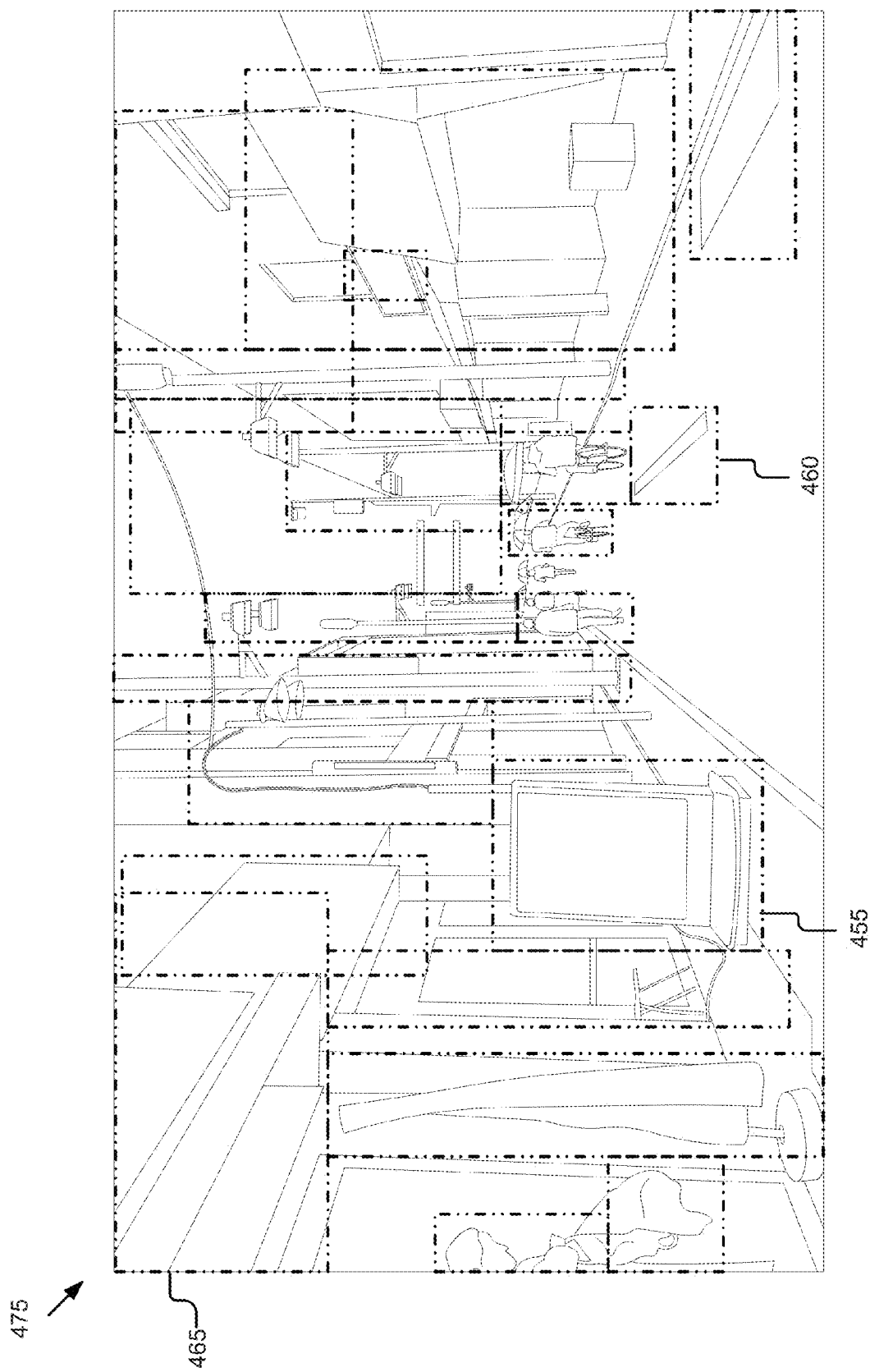
FIG. 4D is a graphic representation of the example real-time image of the road with bounding boxes around the superpixel regions.

FIG. 4D is a graphic representation 475 of the example real-time image of the road with bounding boxes around the superpixel regions. The bounding boxes are over inclusive in that they include superpixel regions that may not correspond to objects of interest. For example, bounding box 455 includes a store sign, bounding box 460 includes a road divider, and bounding box 465 includes a storefront sign.

The pruning module 212 can include code and routines for identifying a road region and pruning bounding boxes. In some implementations, the prior map module 208 can include a set of instructions executable by the processor 225 to provide the functionality described below for identifying the road region and pruning bounding boxes. In some implementations, the pruning module 212 can be stored in the memory 227 of the object detection device 200 and can be accessible and executable by the processor 225. The pruning module 212 is coupled to the bus 220 via signal line 213.

The pruning module 212 may receive a road prior map from the prior map module 208 or retrieve the road prior map from the memory 227. The pruning module 212 may compare the superpixel regions to the road prior map to identify a road region, a central horizon line, and an approximate vanishing point in the real-time image.

The pruning module 212 prunes bounding boxes from a set of bounding boxes generated by the bounding box module 210. The pruning module 212 may prune noisy bounding boxes, non-road objects, and objects with aspect ratios that fail to correspond to objects expected for the corresponding location.

The pruning module 212 determines noisy bounding boxes by identifying smaller superpixel regions that are noisy regions in the real-time image that fail to contain an object of interest. The pruning module 212 determines a box area relative to an image resolution of the real-time image for each of the bounding boxes. The pruning module 212 compares the box area relative to the image resolution to a threshold value. If the box area falls below the threshold value, the pruning module 212 prunes the bounding box from the set of bounding boxes. The pruning module 212 may store the box areas for the bounding boxes as categorization data 293.

The pruning module 212 may reduce unnecessary computation by pruning non-road objects. The pruning module 212 may use the road prior map to select a midline in the real-time image that divides the real-time image into a lower road region of interest and an area lying above the horizon that contains structures, foliage, etc. The pruning module 212 prunes bounding boxes that are considerably outside the road region or that have a centroid value that is located above the horizon line. For example, building structures occupy a comparatively larger bounding box and are typically located on the sides of the road. The building structures do not contain objects of interest and therefore can be removed from the set of remaining bounding boxes that are further processed by the categorization module 214. For example, the pruning module 212 prunes the bounding box for the storefront sign 465 in FIG. 4C because the bounding box for the storefront sign 465 is outside of the road region.

The pruning module 212 prunes objects with aspect ratios that fail to correspond to objects expected for the corresponding location. The pruning module 212 may determine a bounding box aspect ratio and a location of each bounding box in the set of bounding boxes. The pruning module 212 may compare the bounding box aspect ratio to a list of approved bounding box aspect ratios for the location based on the prior maps. The pruning module 212 may prune bounding boxes from the set of bounding boxes where the bounding box aspect ratio fails to match one of the approved bounding box aspect ratios in the list of approved bounding box aspect ratios for the location. The pruning module 212 may save the aspect ratio and the location of the bounding box as categorization data 293 in the memory.

For example, electric poles and streetlights are long vertical structures that are typically located on the sides of a road. If the pruning module 212 identified a bounding box with a long height and a narrow width in the center of the road in a real-time image, the pruning module 212 would prune the bounding box from the set of bounding boxes.

Figure 4E:
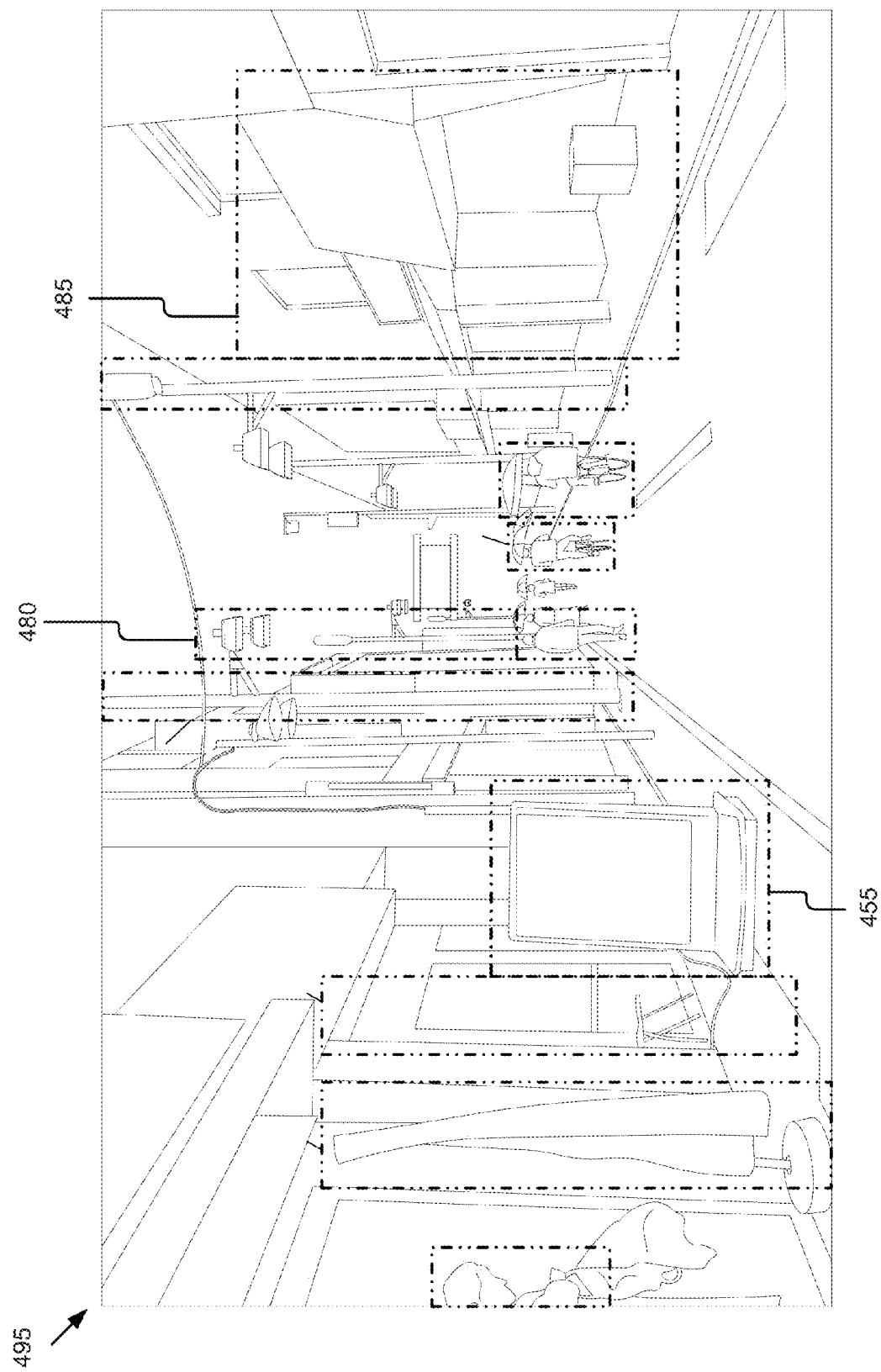
FIG. 4E is a graphic representation of the example real-time image of the road with the remaining set of pruned bounding boxes.

FIG. 4E is a graphic representation 495 of the example real-time image of the road with the remaining set of pruned bounding boxes. The pruning module 212 removed the bounding box 460 from FIG. 4C because the box area for the image resolution was too small to be associated with an object of interest. The pruning module 212 removed the bounding box 465 from FIG. 4C because the bounding box was above the road region.

The categorization module 214 can include code and routines for performing feature extraction and categorization to identify objects. In some implementations, the categorization module 214 can include a set of instructions executable by the processor 225 to provide the functionality described below for performing feature extraction and categorization. In some implementations, the categorization module 214 can be stored in the memory 227 of the object detection device 200 and can be accessible and executable by the processor 225. The categorization module 214 is coupled to the bus 220 via signal line 215.

After the pruning module 212 reduces the set of bounding boxes to a set of remaining bounding boxes, the categorization module 214 may determine a type of categorization model to apply to each bounding box in the set of remaining bounding boxes. The categorization module 214 may receive bounding box aspect ratios and locations of each bounding box in the set of remaining bounding boxes from the pruning module 212 or retrieve them from the memory 227. The type of categorization models may include one or more of a vehicle categorization model, a pedestrian categorization model, a pole categorization model, a bicycle categorization model, a motorcycle categorization model, a stationary bicycle and motorcycle categorization model, and a construction cone categorization model. The categorization module 214 may use the type of categorization model to identify a presence or an absence of an object within each of the bounding boxes in the set of remaining bounding boxes.

Table 1 below includes example decision metrics for determining a type of classifier to run on the bounding boxes in the set of remaining bounding boxes.

TABLE 1

| ROAD OBJECTS OF INTEREST | ASPECT RATIO | MOST LIKELY LOCATION ON ROAD | CHARACTERISTIC FEATURES |
|---|---|---|---|
| Small Sized Cars, Large Sized Cars | width > height | center of the road, side lanes | Car Categorization Module bag of words categorization model, Haar like features |
| Pedestrians | height > width | sidewalk, height below horizon level. If car stationary at signal, then likely to occur in center (crossing the street) | Pedestrian Categorization Module histogram of oriented graidents (HoG) descriptors |
| Electric Poles, Streetlights | height > width; height > (3 * image_height/4) | sidewalk, height above horizon level | Pole Categorization Module bag of words model, line detector |
| Bicycle | height > width | sides of main road, side lanes | Bicycle Categorization Module deformable part model, HoG based descriptors |
| Motorcycle | height > width | mostly on center of main road | Motorcycle Categorization Module deformable part model, HoG based descriptors |
| Parked Bicycle, Parked Motorcycle | height > width; height < (image_height/2) | sidewalk, height < horizon level | Bicycle/Motorcycle Categorization Module deformable part model, HoG based descriptors |
| Construction Cones | small bounding boxes, height > width | center of road, on middle lane boundaries, below horizon level | Construction Cone Categorization bag of words model, template matching |

If the categorization module 214 determines a presence of an object within a bounding box, the categorization module 214 may generate a list of object labels in the real-time image. As a result, the categorization module 214 determines objects in front of a user 125 of the first client device 103 or the mobile client device 188 of FIG. 1. The categorization module 214 saves the list of object labels as categorization data 293. In some implementations, the categorization module 214 transmits the list of object labels to the guidance module 216 via the communication module 202.

Referring again to FIG. 4E, the categorization module 214 determines a type of categorization model to apply to each bounding box in the set of remaining bounding boxes. For example, the categorization module 214 applies a vehicle categorization model to bounding box 455, a pole categorization model to bounding box 480, and a vehicle categorization model to bounding box 485. The categorization module 214 may determine that some of the bounding boxes in the set of remaining bounding boxes do not contain objects of interest. For example, bounding box 455 contains an object, but the object is a store sign and therefore not an object of interest. In another example, bounding box 485 fails to contain any object. Conversely, bounding box 480 contains an object and the object is a pole, which is one of the objects of interest. As a result, the categorization module 214 identifies the presence of a pole object within the bounding box 480 and assigns the pole category to the bounding box 480. The categorization module 214 may add the pole object to a list of objects.

The guidance module 216 can include code and routines for guiding a user. In some implementations, the guidance module 216 can include a set of instructions executable by the processor 225 to guide the user. In some implementations, the guidance module 216 can be stored in the memory 227 of the object detection device 200 and can be accessible and executable by the processor 225. The guidance module 216 is coupled to the bus 220 via signal line 217.

In some implementations, the guidance module 216 provides route guidance based on the identified objects. The guidance module 216 may request driving directions from a map application stored on the second server 198. The guidance module 216 may receive the driving directions and modify the driving directions based on the list of objects. For example, the guidance module 216 may supplement the driving directions with information about objects. In some implementations, the guidance module 216 may receive information about a list of objects in a particular location from a cloud-based application running on the second server 198. For example, the list of objects may be along a route that is part of the driving directions. The guidance module 216 may modify the driving directions based on the list of objects, for example, to avoid heavily congested traffic areas or roads with obstacles in the road. Alternatively or additionally, the guidance module 216 may estimate that the first client device 103 is about to travel along the same route as the list of objects based on journey data 295 associated with the user 125.

Alternatively or additionally, the guidance module 216 may use the list of objects to provide more granular guidance to a user. For example, the guidance module 216 may warn the user about letting the first client device 103 of FIG. 1 drift too far to the right within a lane because a bicycle may be in a right-hand lane.

The user interface module 218 can include code and routines for generating graphical data for providing user interfaces. In some implementations, the user interface module 218 can include a set of instructions executable by the processor 225 to provide the functionality described below for generating graphical data for providing user interfaces. In some implementations, the user interface module 218 can be stored in the memory 227 of the object detection device 200 and can be accessible and executable by the processor 225. The user interface module 218 is coupled to the bus 220 via signal line 219.

In some implementations, the user interface module 218 receives instructions from the guidance module 216 to generate graphical data for displaying a user interface that includes guidance information for the user. For example, the user interface may include driving directions, a visualization of objects in the road up ahead, etc. The user interface module 218 may also generate a user interface for a user to configure settings for the object detection application 199.

Example Method

Figure 5A:
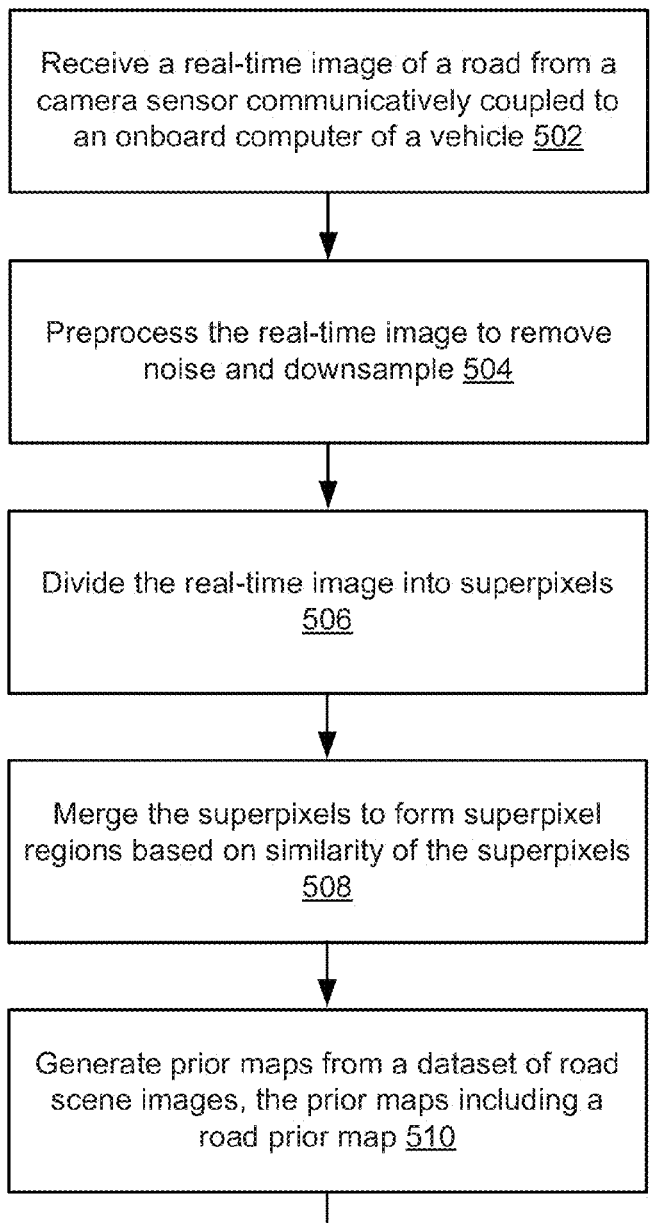
FIGS. 5A-5B is a flowchart of an example method for detecting roadway objects in a real-time image.
Figure 5B:
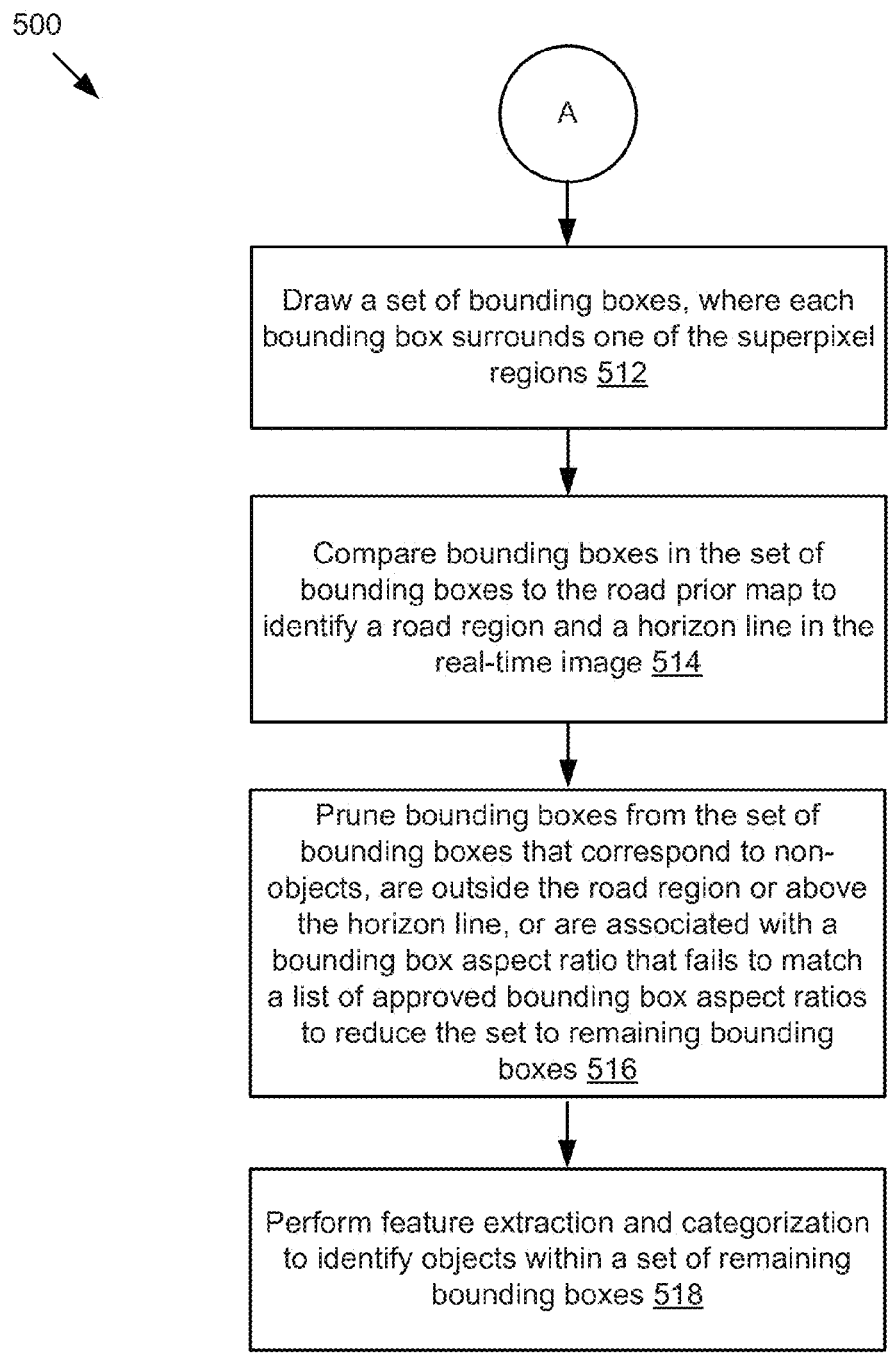

FIGS. 5A and 5B show example flow diagrams of a method 500 for detecting roadway objects in a real-time image. The method 500, in some implementations, may be performed, in whole or in part, by an application such as the object detection application 199 of FIGS. 1 and 2 and/or the object detection device 200 of FIG. 2. For instance, the object detection application 199 of FIG. 1 or 2 may be programmed to execute computer instructions stored on the memory 227 to perform functions and operations as represented by one or more of the blocks of the method 500 of FIGS. 5A and 5B. For example, the object detection application 199 may include a preprocessing module 204, a superpixel module 206, a prior map module 208, a bounding box module 210, a pruning module 212, and a categorization module 214. Although illustrated as discrete blocks, various blocks may be divided into additional blocks, combined into fewer blocks, or eliminated, depending on the desired implementation.

At block 502, a real-time image of a road is received from a camera sensor communicatively coupled to an onboard computer of a vehicle. For example, the preprocessing module 204 may receive a real-time image of a road from a camera 231 sensor communicatively coupled to an onboard computer of a vehicle. At block 504, the real-time image is preprocessed to remove noise and downsample. For example, the preprocessing module 204 may preprocess the real-time image to remove noise and downsample.

At block 506, the real-time image is divided into superpixels. For example, the superpixel module 206 may divide the real-time image into superpixels. At block 508, the superpixels are merged to form superpixel regions based on similarity of the superpixels. For example, the superpixel module 206 merges the superpixels to form superpixel regions based on similarity to the superpixels.

At block 510, prior maps are generated from a dataset of road scene images, the prior maps including a road prior map. For example, the prior map module 208 generates prior maps from the dataset of road scene images. At block 512, a set of bounding boxes are drawn where each bounding box surrounds one of the superpixel regions. For example, the bounding box module 210 draws a set of bounding boxes, where each bounding box surrounds one of the superpixel regions.

At block 514, bounding boxes in the set of bounding boxes are compared to the road prior map to identify a road region and a horizon line in the real-time image. For example, the pruning module 212 compares the bounding boxes in the set of bounding boxes to the road prior map to identify a road region and a horizon line in the real-time image. At block 516, bounding boxes from the set of bounding boxes are pruned that correspond to non-objects, are outside the road region or above the horizon line, or are associated with a bounding box aspect ratio that fails to match a list of approved bounding box aspect ratios to reduce the set to remaining bounding boxes. For example, the pruning module 212 prunes the bounding boxes.

At block 518, feature extraction and categorization is performed to identify objects within the set of remaining bounding boxes. For example, the categorization module 214 performs feature extraction and categorization to identify objects within the set of remaining bounding boxes.

The descriptions of the specification can also relate to an apparatus for performing the operations herein. This apparatus may include the user of a special-purpose or general-purpose computer including various computer hardware or software modules. Implementations described herein may be implemented using a computer program stored in the computer. Such a computer program may be stored in a non-transitory computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations, or some implementations containing both hardware and software elements. In some implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those that practice the art of computer programming. Additionally, the disclosure is in no way limited to implementations in any specific programming language, or for any specific operating system or environment. Accordingly, the disclosure is intended to be illustrative, but not limiting, of the scope of the specification, which is set forth in the following claims.

What is claimed is:

1. A method for identifying roadway objects, the method comprising:
    receiving a real-time image of a road from a camera sensor communicatively coupled to an onboard computer of a vehicle;
    dividing the real-time image into superpixels;
    merging the superpixels to form superpixel regions based on similarity of the superpixels;
    generating prior maps from a dataset of road scene images, the prior maps including a road prior map and location data that indicates where certain roadway objects are expected to be located within the real-time image;
    drawing a set of bounding boxes where each bounding box surrounds one of the superpixel regions;
    comparing bounding boxes in the set of bounding boxes to the road prior map to identify a road region in the real-time image;
    determining a proximity of each bounding box in the set of bounding boxes to the road region in the real-time image;
    determining a bounding box aspect ratio and a location of each bounding box in the real-time image based on the proximity of each bounding box in the set of bounding boxes to the road region;
    comparing the bounding box aspect ratio of each bounding box to a list of approved bounding box aspect ratios for the location based on the prior maps;
    pruning bounding boxes from the set of bounding boxes to reduce the set of bounding boxes to a set of remaining bounding boxes when:
        the bounding boxes have the bounding box aspect ratio that is inconsistent with the list of approved bounding box aspect ratios for the location based on the bounding box aspect ratio failing to match one or more approved bounding box aspect ratios in the list of approved bounding box aspect ratios for the location, or
        the bounding boxes are outside the road region; and
    performing feature extraction and categorization to identify objects within the set of remaining bounding boxes based in part on the location data that indicates where the certain roadway objects are expected to be located within the real-time image.

2. The method of claim 1, further comprising providing route guidance based on the identified objects.

3. The method claim of 1, wherein merging the superpixels to form superpixel regions based on similarity of the superpixels includes determining texture and similarity of colors of the superpixels.

4. The method of claim 1, further comprising:
    determining a box area relative to an image resolution of the real-time image for each of the bounding boxes in the set of bounding boxes;
    wherein pruning bounding boxes from the set of bounding boxes also occurs when the box area falls below a threshold value.

5. The method of claim 1, wherein performing feature extraction and categorization comprises applying a type of categorization model to each of the remaining bounding boxes based on the bounding box aspect ratio and the location of each bounding box and further comprising:
    identifying a presence or an absence of an object within each of the bounding boxes in the set of remaining bounding boxes; and
    determining a type of object based on the feature extraction and categorization.

6. The method of claim 5, wherein the type of categorization model includes one or more of a vehicle categorization model, a pedestrian categorization model, a pole categorization model, a bicycle categorization model, a motorcycle categorization model, a stationary bicycle and motorcycle categorization model, and a construction cone categorization model.

7. The method of claim 1, further comprising:
    determining coordinates and a centroid value for each of the bounding boxes in the set of bounding boxes; and comparing the superpixel regions to the road prior map to identify a horizon line and an approximate vanishing point in the real-time image;
wherein pruning bounding boxes from the set of bounding boxes also occurs when the bounding boxes have the centroid value located above the horizon line.

8. The method of claim 1, wherein merging the superpixels to form superpixel regions based on similarity of the superpixels is based on using a graph-based agglomerative technique.

9. The method of claim 1, wherein the superpixel regions include structures and objects.

10. The method of claim 1, wherein the certain roadway objects include one or more of a different vehicle, a construction cone, a pedestrian, a bicycle, a sky, a motorcycle, foliage, a tree, an electrical pole, a streetlight, a road, and a road sign.

11. The method of claim 1, further comprising preprocessing the real-time image to remove noise and downsample.

12. A non-transitory computer-readable medium having computer instructions stored thereon that are executable by a processing device to perform or control performance of steps comprising:
receiving a real-time image of a road from a camera sensor communicatively coupled to an onboard computer of a vehicle;
dividing the real-time image into superpixels;
merging the superpixels to form superpixel regions based on similarity of the superpixels;
generating prior maps from a dataset of road scene images, the prior maps including a road prior map;
drawing a set of bounding boxes where each bounding box surrounds one of the superpixel regions;
comparing bounding boxes in the set of bounding boxes to the road prior map to identify a road region in the real-time image;
determining a proximity of each bounding box in the set of bounding boxes from the road region in the real-time image;
determining a bounding box aspect ratio and a location of each bounding box in the real-time image based on the proximity of each bounding box in the set of bounding boxes to the road region;
comparing the bounding box aspect ratio of each bounding box to a list of approved bounding box aspect ratios for the location based on the prior maps;
pruning bounding boxes from the set of bounding boxes to reduce the set of bounding boxes to a set of remaining bounding boxes when:
the bounding boxes have the bounding box aspect ratio that is inconsistent with the list of approved bounding box aspect ratios for their location based on the bounding box aspect ratio failing to match one or more approved bounding box aspect ratios in the list of approved bounding box aspect ratios for the location, or
the bounding boxes are outside the road region; and
performing feature extraction and categorization to identify objects within the set of remaining bounding boxes.

13. The non-transitory computer-readable medium of claim 12, the steps further comprising providing route guidance based on the identified objects.

14. The non-transitory computer-readable medium of claim 12, wherein merging the superpixels to form superpixel regions based on similarity of the superpixels includes determining texture and similarity of colors of the superpixels.

15. The non-transitory computer-readable medium of claim 12, the steps further comprising:
determining a box area relative to an image resolution of the real-time image for each of the bounding boxes in the set of bounding boxes;
wherein pruning bounding boxes from the set of bounding boxes also occurs when the box area falls below a threshold value.

16. The non-transitory computer-readable medium of claim 12, wherein performing feature extraction and categorization comprises applying a type of categorization model to each of the remaining bounding boxes based on the bounding box aspect ratio and the location of each bounding box and the steps further comprise:
identifying a presence or an absence of an object within each of the bounding boxes in the set of remaining bounding boxes; and
determining a type of object based on the feature extraction and categorization.

17. The non-transitory computer-readable medium of claim 16, wherein the type of categorization model includes one or more of a vehicle categorization model, a pedestrian categorization model, a pole categorization model, a bicycle categorization model, a motorcycle categorization model, a stationary bicycle and motorcycle categorization model, and a construction cone categorization model.

18. A method for identifying roadway objects, the method comprising:
receiving a real-time image of a road from a camera sensor communicatively coupled to an onboard computer of a vehicle;
dividing the real-time image into superpixels;
merging the superpixels to form superpixel regions based on similarity of the superpixels;
generating prior maps from a dataset of road scene images, the prior maps including a road prior map;
drawing a set of bounding boxes where each bounding box surrounds one of the superpixel regions;
comparing bounding boxes in the set of bounding boxes to the road prior map to identify a road region in the real-time image;
determining a bounding box aspect ratio and a location of each bounding box in the real-time image based on proximity to the road region;
comparing the bounding box aspect ratio to a list of approved bounding box aspect ratios for the location based on the prior maps;
pruning bounding boxes from the set of bounding boxes:
where the bounding box aspect ratio fails to match one of the approved bounding box aspect ratios in the list of approved bounding box aspect ratios for the location outside the road region to reduce the set to remaining bounding boxes, or
the bounding boxes are outside the road region;
performing feature extraction and categorization to identify objects within the remaining bounding boxes by assigning a type of categorization to each of the remaining bounding boxes based on the bounding box aspect ratio and the location of each bounding box;
identifying a presence or an absence of an object within each of the remaining bounding boxes; and determining a type of object based on the feature extraction and categorization.

\* \* \* \* \*